TAPE PERFORATOR

Filed Dec. 14, 1960

INVENTOR
ERNST W. KETTNICH
BY E. A. Kane
ATTORNEY 3,024,971
Patented Mar. 13, 1962

3,024,971

TAPE PERFORATOR

Ernst W. Kettnich, Morton Grove, Ill., assignor to Teletype Corporation, Skokie, Ill., a corporation of Delaware Filed Dec. 14, 1960, Ser. No. 75,754
10 Claims. (Cl. 234—111)

This invention relates to tape perforators and more particularly to a tape perforator capable of handling tapes of different widths.

In the printing telegraph art a five unit permutation code, commonly called the "Baudot" code, has been adopted almost universally and frequently this five unit code is perforated into tapes under control of signals which have been transmitted telegraphically or under control of a keyboard to prepare tape to be used in the transmission of permutation code signals over telegraph lines. With the development of computers and other data handling devices, codes other than the five unit code have come into use, such for example, as the eight unit codes used in some data handling apparatus. In view of these recent developments a need has arisen for a perforator capable of perforating both of these types of tapes. Obviously, the tape for use in some data handling devices, being an eight unit tape, is somewhat wider and has the levels of perforations disposed differently with respect to the center line of the tape than the tape in common usage for telegraphic work.

It is an object of the present invention to provide a tape perforator capable of handling tapes of different widths.

Another object of the present invention is to provide a tape perforator capable of interchangeably handling a tape having a predetermined number of levels or a tape having a different number of levels than said predetermined number.

A still further object of the present invention is to provide a tape perforator having a punch and die block in which there are formed tape guiding slots for handling tapes of two different widths for perforation by a single set of punches.

In accordance with one embodiment of the invention a tape perforating mechanism of the type disclosed in the patent to R. E. Arko and C. W. Swan, Patent No. 2,951,902, issued September 6, 1960, is provided with a single row of punches for cooperation with a punch block having two tape slots formed in it, one above the other, for handling tapes of two different widths and is also provided with tape entry guides one superposed on the other for directing tapes of two different widths to a tape indenting and feeding wheel which will feed the tape of one width into one of the tape slots in the punch block and will feed a tape of a second width into the second slot in the punch block.

A complete understanding of the present invention may be had by reference to the following detailed description when considered in conjunction with the accompanying drawings wherein.

Figures 1, 2, 3, 4:
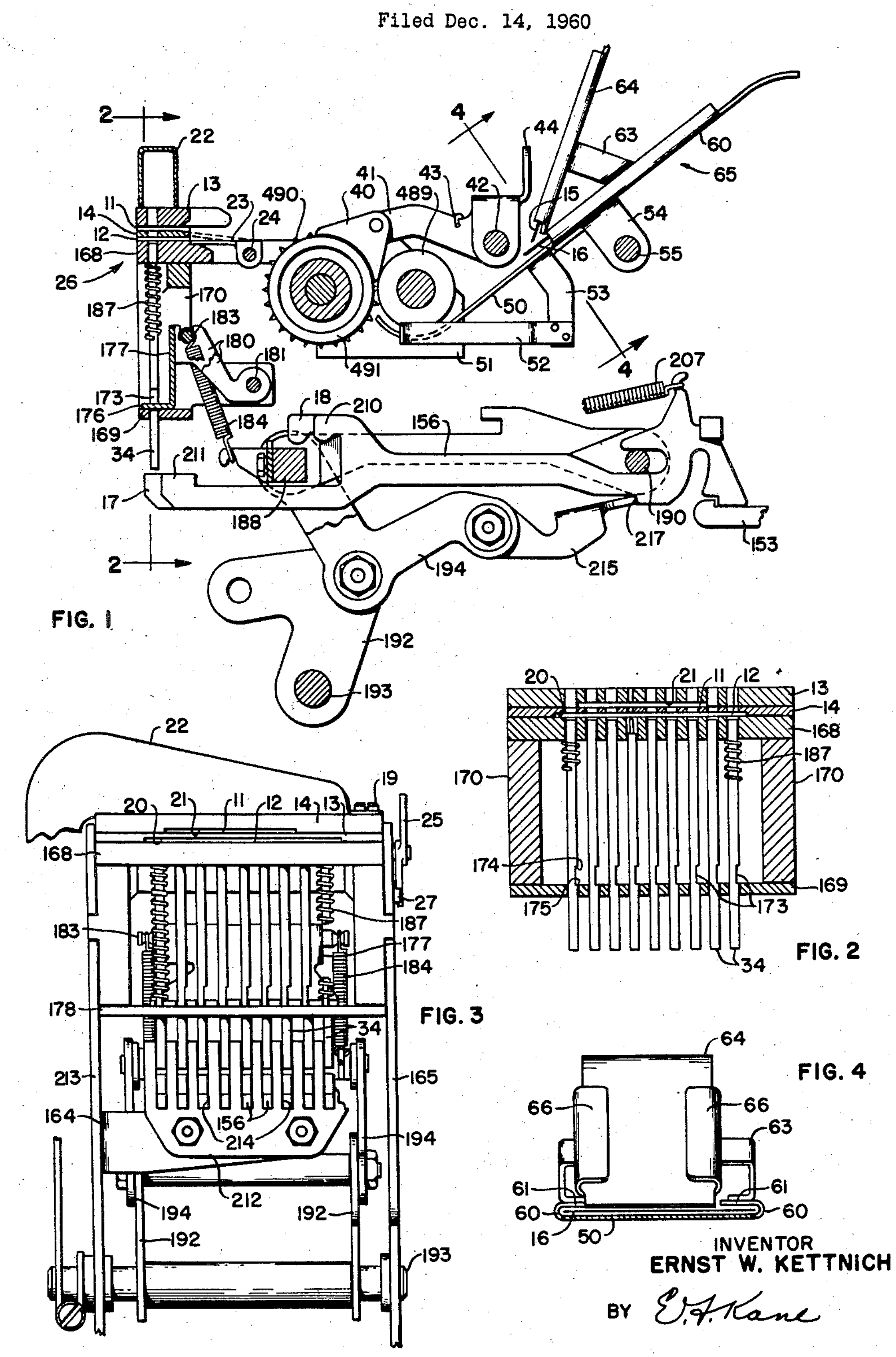
FIG. 1 is a longitudinal sectional view of a tape perforating mechanism constructed in accordance with the present invention.
FIG. 2 is a transverse sectional view taken substantially along line 2—2, of FIG. 1, in the direction of the arrows and showing the superposed arrangement of the two tape guiding slots.
FIG. 3 is an end elevational view of the apparatus shown in FIG. 1, with parts broken away more clearly to show parts in back of them.
FIG. 4 is a transverse sectional view taken substantially along the line 4—4 of FIG. 1 in the direction of the arrows, showing the tape entry guides in cross-section.

By reference to the drawing wherein like reference characters designate the same parts throughout the several views, it will be noted that those parts common to the present invention and to the apparatus shown in the aforementioned patent to R. E. Arko and C. W. Swan have applied to them, the reference numerals used in the said patent to R. E. Arko and C. W. Swan the disclosure of which is incorporated herein by reference.

In the above-mentioned patent to R. E. Arko et al. the reception of a telegraphic signal, through instrumentalities not shown in the present application but shown in detail and described in the R. E. Arko et al. patent, will cause selector slide latches 153 to be tripped selectively upon receipt in the apparatus of a permutation code signal. Each of the selector slide latches 153 that is tripped will release its associated punch selector slide 156 and permit the contractile spring 207 associated with the slide 156 to move the slide 156 to the left as shown in FIG. 1. These punch selector slides 156 will thus move their head portions 211 into cooperative association with punches 34 and, upon actuation of a cross-bar 188 by a bell crank lever 194, will drive the selected punches 34 upwardly. The mechanism for actuating the bell crank lever 194 includes the bell crank lever 192 which is oscillated by a shaft 193.

As illustrated in the patent to R. E. Arko et al. there are five punches 34 provided but there is provision for adding another three punches to increase the number of perforations that may be made in a tape to eight. A tape may be fed into association with the punches 34 by a tape feed wheel 491 having pins 490 extending from it and cooperating with a roller 489 to which the tape is directed. After a punching operation, the punches are retracted to the position shown in the drawing by a stripper bracket 177 pivoted on a pivot shaft 181 and urged to follow the movement of the cross-bar 188 by springs 184 attached to a cross-rod 183 that extends between two arms 180 of the bracket 177. The punches used in apparatus being described herein are designed to fully perforate the tape rather than to partially perforate it, as were the punches 34 disclosed in the patent to R. E. Arko et al. However, the punches 34 of the apparatus being described herein are also provided with shoulders 174 and 175 formed by milling away a part of each punch as shown at 173 so that the horizontally extending portion 176 of the stripper bracket 177 which is provided with slots 178 may restore the punches 34 in the same manner that they are restored in the apparatus disclosed in the R. E. Arko et al. patent mentioned hereinbefore.

The punches 34 are guided in an upper guide plate 168 and a lower guide plate 169 forming part of a punch mechanism 26 in the same manner as were the punches in the apparatus disclosed in the R. E. Arko et al. patent. The upper portion of the punch mechanism 26, however, is formed with a pair of tape slots 11 and 12 formed by milling away a portion of two die plates 13 and 14 to form tape guiding grooves in the plates and then superposing them to provide the tape slots for receiving and guiding tapes 15 and 16 of different widths.

As will be seen by reference to FIG. 3 the punch actuating ends of the punch selector slides 156 are guided in a slotted guide plate 212 which is mounted on a bracket 213 suitably positioned in the apparatus. The guide plate 212 has a plurality of slots 214 formed in it, one slot being provided for each of the punch selector slides 156. Any of the punch selector slides 156 which have been moved to the left (FIG. 1) to select an associated punch 34 for actuation will be restored to the condition shown in FIG. 1, by a bail 215 which is pivotally mounted on the free ends of the bell cranks 194, at the proper time in the operation of the apparatus as described in the patent to R. E. Arko et al. mentioned hereinbefore.

In the apparatus of the present invention a tape feed hole is perforated in the tape each time the cross-bar 188 is moved upwardly and this tape feed hole, which may be a smaller hole than the others perforated in the tape, is made by a punch 34 associated with a punch actuator member 17 that is pivoted on the shaft 190 but is not slidable thereon and has no restoring shoulder 217 such as that provided on the punch selector slides 156. This punch actuator 17 has a shoulder 18 on it similar to the shoulder 210 on the slides 156 but the shoulder 18 is always positioned to be engaged by the cross-bar 188.

The punch block or punch mechanism 26 includes in addition to the upper guide plate 168 and lower guide plate 169, a pair of spacer blocks 170 which hold the upper and lower guide plates 168 and 169 in spaced relation. The die plate 14 is suitably fixed to the upper surface of the upper guide plate 168, for example by means of screws 19, and is mounted directly on the guide plate 168. The die plate 14 has a groove 20 milled in it which is of a width such that it will guide a wide tape. In the embodiment of the invention disclosed herein, this wide tape is one adapted for 8 level perforation. The upper die plate 13 has a groove 21 milled in it for cooperation with the upper surface of the die plate 14 to define the tape slot 11 and the plate 13 is superposed on the plate 14 and the assemblage of the two plates 13 and 14 and guide plate 168 are fixed to the spacer block 170 by means of the screws 19.

As will be apparent by reference to FIG. 2, a tape fed into the slot 11 may have five of the punches 34 operatively associated with it to perforate into the tape a five unit code whereas a wide tape fed into the slot 12 may be perforated with 5, 6, 7 or 8 level codes. All of the punches 34 are of the same length and when in their unoperated position are located in the position shown in FIG. 2. When any one of the punches 34 is selected and actuated, it will move the same distance as any other punch and if the tape in position to be perforated is a wide tape any desired code may be perforated in the tape up to an eight level code depending upon the punches selected for operation. Since the present apparatus is designed for perforating fully perforated tape a chad chute 22 is provided which may be connected to any suitable suction device to draw the chad, which is punched out of a tape, away from the die plate 13. The two punches 34 at the opposite end of the row of punches have coil springs 187 surrounding them and bearing against the under side of the guide plate 168 the upper surface of the horizontal projection 176 of the stripper bail 177 in the same manner as the spring 187 disclosed in the R. E. Arko et al. patent mentioned hereinbefore.

As illustrated in FIGS. 1 and 3 a deflector plate 23 is pivotally mounted in the framework of the apparatus on a shaft 24 and may be held in the position shown in FIG. 1 in full lines or may be rocked into the position shown in dotted lines by a manually operable lever 25 fixed to the shaft 24 and held in either of its selected positions by any suitable spring device such as the spring 27 shown in FIG. 3. Tape from suitable sources of supply may be directed to the tape slots 11 and 12 by the tape feed wheel 491 which has indenting pins 490 disposed around its surface for cooperation with a roller 489. The tape feed wheel will thus indent a tape which is directed to it and the tape may be held in intimate relation with the feed wheel 491 by a tape depressor 40 mounted on the end of a lever 41 suitably pivoted on a pivot shaft 42 mounted in the framework of the apparatus. The lever 491 is urged to the position shown in FIG. 1 by a spring 43 and may be rotated clockwise about the pivot shaft 42 by manipulating a handle 44 on the shaft. The tape depressor 40 serves to hold the tape against the feed wheel 491 and to direct it downwardly against the top surface of the upper guide plate 168 to feed tape into the tape slot 12 or if the deflector plate 23 is moved to the dotted position (FIG. 1) to feed the tape into the upper tape slot 11.

Tape from two different sources of supply, not shown, may be directed and guided to the tape feed wheel by a tape guiding plate 50 the bottom end of which is curved to direct tape upwardly into the bite of roller 489 and tape feed wheel 491. The tape will be urged over to engage its far edge, as viewed in FIG. 1, with the far edge of its tape entry guide by a leaf spring 52 which has sufficient flexibility so that it will move tape of either the wide or narrow width over to engage the rear edge of its associated tape entry guide. The spring 52 is mounted on a bracket 53 that is in turn fixed to the plate 50. The bracket 53 has a pair of arms 54 formed on it, only one of which is shown in FIG. 1, for supporting the bracket 53 on a cross-rod 55. The sides of the plate 50 are bent over as shown at 60 (FIG. 4) to provide lips 61 that serve to hold the tape 16 and direct it to the roller 489. This plate 50 has its lips 61 spaced widely enough to accept a tape of the type for recording eight level codes. Mounted on the lips 61 is a bracket 63 for supporting a tape entry guide 64 similar to the tape entry guide 65 comprised of the plate 50 and its bent-over portions. The tape entry guide 64 has bent-over tape retaining lips 66 similar to the lips 61 but spaced apart on the tape entry guide 64 a distance smaller than the spacing of the lips 61 on the plate 50. This tape entry guide is of a width such that it will guide and direct a tape for a five level code down to the plate 50 at a point beyond the lips 61 of the plate 50 so that the plate 50 may direct a five level code tape toward the roller 489 and feed wheel 491.

From the foregoing, it will be apparent that a tape of a width such that it may be perforated with a 6, 7 or 8 level code may be directed from a suitable supply source, not shown, through the tape entry guide 65 where the lower curved portion of the plate 50 will direct it into the bite of the rollers 489 and feed wheel 491. When the feed wheel 491 is actuated step-by-step as described in detail in the aforementioned R. E. Arko et al. patent, the tape will be directed, through cooperation of the tape depressor 40 and feed wheel 491, into engagement with the upper surface of the upper guide plate 168 and into the tape slot 12. Similarly, a tape of a width sufficient to record a five level code may be fed through the tape entry guide 64 and down into engagement with the plate 50 which will direct it into the bite of the feed wheel 491 and rollers 489. When the feed wheel 491 is actuated step-by-step this tape will then be fed toward the punch block and as the deflector plate 23 is moved to the dotted line position (FIG. 1) the tape may be fed into the slot 11 for perforaion by the punches 34.

Although a specific embodiment of the invention has been described hereinbefore, it will be understood that numerous modifications of the structure may be made without departing from the invention.

What is claimed is:

1. In a tape perforator, a plurality of perforating punches, a pair of die plates for cooperation with said punches, a plurality of permutatively settable elements for selectively actuating said punches, a tape guiding groove formed in one of said die plates for guiding a tape of one width, a tape guiding groove formed in the other of said die plates for guiding a tape of a different width, and means for feeding tape of either of said widths to its particular tape guiding groove.

2. In a tape perforator a row of perforating punches for reciprocation in one direction, a pair of die plates one superposed on the other and extending across the row of punches in a direction normal to said one direction, a plurality of permutatively settable elements for selectively actuating said punches, a tape guiding groove formed in one of said die plates for guiding a tape of one width, a tape guiding groove formed in the other of said die plates for guiding a tape of a different width, and means for feeding tape of either of said widths to its particular tape guiding groove.

3. In a tape perforator, a plurality of perforating punches, a plurality of die plates associated with said punches and providing a plurality of tiers of die apertures in line with said punches through which said punches are movable, a plurality of permutatively settable elements for selecting predetermined ones of said punches for actuation, a common actuator for actuating the selective punches, a tape guiding groove formed in each of said die plates for guiding a tape directed to it to operative association with the punches, and a tape entry guide individual to each guide groove for feeding tape of one of a plurality of widths to its particular tape guiding groove.

4. In a tape perforator, a plurality of perforating punches, a pair of die plates for cooperation with said punches, a plurality of permutatively settable elements for selectively actuating said punches, a tape guiding groove formed in one of said die plates for guiding a tape of one width, a tape guiding groove formed in the other of said die plates for guiding a tape of a different width, means for feeding tape of either of said widths toward the tape guiding grooves and tape deflecting means positionable to direct a tape from the feeding means to a particular selected groove.

5. In an apparatus for perforating tape with permutation codes to register therein information in codes, a pair of tape entry guides for feeding either of two different widths of tape into the apparatus, feed means for drawing either width of tape through its tape entry guide, a punch block, a plurality of selectively actuatable punches arranged in a row and slidably mounted in said punch block, and a pair of die plates, one superposed on the other, and having tape guiding surfaces formed in them for guiding tapes of two different widths past the row of punches in the punch block, said tape guiding surfaces being of different widths.

6. In an apparatus for perforating tape with permutation codes to register therein information in distinct codes, a pair of tape entry guides one superposed on the other for feeding either of two different widths of tape into the apparatus, feed means for drawing either width of tape through its tape entry guide, a punch block, a plurality of punches arranged in a row and slidably mounted in said block, and a pair of die plates extending in a direction normal to said punches and having tape guiding slots individual to them for guiding tapes of two different widths past the row of punches in the punch block, said tape guiding slots being of different widths and said die plates being in superposed relation one to the other.

7. In an apparatus for perforating tape with permutation codes to register therein information in distinct codes, a pair of tape entry guides one superposed on the other for feeding either of two different widths of tape into the apparatus, feed means for drawing either width of tape through its tape entry guide, a punch block, a plurality of punches arranged in a row and slidably mounted in said block, a pair of die plates extending in a direction normal to said punches and having tape guiding slots individual to them for guiding tapes of two different widths past the row of punches in the punch block, and tape guiding slots being of different widths and said die plates being in superposed relation one to the other and a tape deflector movable to position to deflect a tape fed by said feed means from one slot to the other.

8. In an apparatus for perforating tape with permutation codes to register therein information in distinct codes, a pair of tape entry guides for feeding either of two different widths of tape into the apparatus, feed means for drawing either width of tape through its tape entry guide, a punch block having a plurality of punches slidably mounted in it, a pair of die plates superposed on the other and each having a tape guiding groove formed in it for guiding a tape past the row of punches in the punch block, said tape guiding groove in one plate being of a different width from the width of the groove in the other plate, and means movable to direct a tape of one width to one guiding groove and to direct a tape of a second width to the second groove.

9. In a tape perforator, a plurality of punches, a pair of die plates having die apertures into which said punches may enter, a plurality of permutatively settable elements for selective operative association with said punches, a common actuator for said elements to cause them to simultaneously actuate their associated punches when they are operatively associated with said punches, a punch block for guiding said punches, one of said die plates being mounted on said punch block and having a tape guiding groove formed in it to cooperate with the punch block in defining a tape slot for positioning one width of tape during the perforation thereof, the other of said die blocks being mounted on the said one die plate and having a tape guiding groove formed in it to cooperate with said one die plate in defining a tape slot for positioning a tape of a second width during the perforating thereof, means for directing tape of both widths toward said tape slots, and tape deflecting means settable to direct a tape to its proper slot.

10. In a tape perforator, a plurality of perforating punches, a pair of die plates associated with said punches and providing two tiers of die apertures in line with said punches through both of which said punches are movable, a plurality of permutatively settable elements for selectively actuating said punches, a tape guiding groove formed in one of said die plates for positioning a tape of one width during the perforation thereof, a tape guiding groove formed in the other of said die plates for positioning a tape of a different width during the perforating thereof, means for feeding tape of either of said widths toward its particular tape guiding groove, and means intermediate the grooves and the feeding means for guiding tape to a particular groove.

References Cited in the file of this patent

UNITED STATES PATENTS 2,951,902 Arko ------------------ Sept. 6, 1960